(12) United States Patent
Schennum et al.

(10) Patent No.: US 12,362,578 B2
(45) Date of Patent: *Jul. 15, 2025

(54) RE-CHARGING PACK FOR AN E-CIGARETTE

(71) Applicant: Nicoventures Trading Limited, London (GB)

(72) Inventors: Steven Michael Schennum, London (GB); Thomas Michael McKeon, London (GB); Matthew Joel Nettenstrom, London (GB); Justin Banker Peart, London (GB)

(73) Assignee: Nicoventures Trading Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,930

(22) Filed: Aug. 24, 2022

(65) Prior Publication Data

US 2022/0407326 A1    Dec. 22, 2022

Related U.S. Application Data

(63) Continuation of application No. 16/947,153, filed on Jul. 21, 2020, now Pat. No. 11,462,926, which is a (Continued)

(30) Foreign Application Priority Data

Mar. 31, 2014    (GB) ...................................... 1405719

(51) Int. Cl.
*H02J 7/00*    (2006.01)
*A24F 40/10*    (2020.01)
(Continued)

(52) U.S. Cl.
CPC ............ *H02J 7/0049* (2020.01); *A24F 40/90* (2020.01); *A24F 40/95* (2020.01); *H02J 7/0042* (2013.01);
(Continued)

(58) Field of Classification Search
CPC .......... A24F 40/95; A24F 47/00; A24F 40/10; H02J 7/0049; H02J 7/0048; H02J 7/0047; H02J 7/0044; H02J 7/0042
See application file for complete search history.

(56) References Cited

U.S. PATENT DOCUMENTS

| D53,386 S | 5/1919 | Thomas |
|---|---|---|
| 2,522,952 A | 9/1950 | Joseph |

(Continued)

FOREIGN PATENT DOCUMENTS

| AU | 2008232897 A1 * | 10/2009 | ............. A24B 15/16 |
|---|---|---|---|
| CA | 2859610 A1 | 6/2013 | |

(Continued)

OTHER PUBLICATIONS

Application and File History for U.S. Appl. No. 29/503,949, filed Sep. 30, 2014, 314 pages.

(Continued)

*Primary Examiner* — Jean F Duverne
(74) *Attorney, Agent, or Firm* — Merchant & Gould P.C.

(57) ABSTRACT

A pack is provided for holding and re-charging an e-cigarette. The pack includes a tube having a substantially cylindrical shape. The tube has a hole defined by an open end of the tube for receiving an e-cigarette into the tube, such that the e-cigarette is held in the tube. The pack further includes a re-charging mechanism for re-charging an e-cigarette held within the tube, and a light for indicating a char-ging state (Continued)

of the e-cigarette in the tube. The light is located at the open end of the tube adjacent the hole for receiving the e-cigarette into the tube.

10 Claims, 5 Drawing Sheets

Related U.S. Application Data continuation of application No. 15/301,178, filed as application No. PCT/GB2015/050957 on Mar. 30, 2015, now Pat. No. 10,750,779.

(51) Int. Cl.
*A24F 40/90* (2020.01)
*A24F 40/95* (2020.01)

(52) U.S. Cl.
CPC .......... H02J 7/0044 (2013.01); H02J 7/0047 (2013.01); *A24F 40/10* (2020.01); *H02J 7/0048* (2020.01)

(56) References Cited

U.S. PATENT DOCUMENTS

| | | | |
|---|---|---|---|
| 3,583,625 A | 6/1971 | Gero | |
| 3,655,325 A | 4/1972 | Toppel | |
| 3,749,234 A | 7/1973 | Gero | |
| 3,886,953 A | 6/1975 | Pope | |
| 3,963,033 A | 6/1976 | Pope | |
| 4,214,658 A | 7/1980 | Crow | |
| D279,508 S | 7/1985 | Shaak et al. | |
| 4,776,353 A | 10/1988 | Lilja et al. | |
| 4,848,376 A | 7/1989 | Lilja et al. | |
| 4,850,006 A | 7/1989 | Sasaki et al. | |
| 4,907,606 A | 3/1990 | Lilja et al. | |
| 4,947,874 A | 8/1990 | Brooks et al. | |
| 5,044,550 A | 9/1991 | Lamm | |
| D322,687 S | 12/1991 | Tschudin | |
| D346,878 S | 5/1994 | Utsch et al. | |
| 5,530,225 A | 6/1996 | Hajaligol | |
| 5,558,429 A | 9/1996 | Cain | |
| 5,612,732 A | 3/1997 | Yuyama et al. | |
| 5,649,554 A | 7/1997 | Sprinkel et al. | |
| D392,069 S | 3/1998 | Rowland | |
| 5,865,185 A | 2/1999 | Collins et al. | |
| 5,878,752 A | 3/1999 | Adams et al. | |
| 5,934,289 A | 8/1999 | Watkins et al. | |
| D414,892 S | 10/1999 | Chen | |
| 5,967,310 A | 10/1999 | Hill | |
| 6,012,459 A | 1/2000 | Keefe | |
| D436,725 S | 1/2001 | Rogers | |
| D441,133 S | 4/2001 | Emery | |
| D449,521 S | 10/2001 | Pinkus et al. | |
| 6,446,793 B1 | 9/2002 | Layshock | |
| 6,530,495 B1 | 3/2003 | Joseph | |
| 6,637,430 B1 | 10/2003 | Voges et al. | |
| 6,803,550 B2 | 10/2004 | Sharpe et al. | |
| 7,293,565 B2 | 11/2007 | Griffin et al. | |
| D566,329 S | 4/2008 | Bagaric et al. | |
| D566,890 S | 4/2008 | Bagaric et al. | |
| 7,409,955 B2 | 8/2008 | Mauldin et al. | |
| 7,455,176 B2 | 11/2008 | Focke et al. | |
| D631,838 S | 2/2011 | Cheng | |
| 7,896,002 B2 | 3/2011 | Watanabe | |
| D650,738 S | 12/2011 | Leung | |
| 8,156,944 B2 | 4/2012 | Han | |
| 8,314,591 B2 | 11/2012 | Terry et al. | |
| 8,448,783 B2 | 5/2013 | Vecchi | |
| D690,461 S | 9/2013 | Chen | |
| D693,055 S | 11/2013 | Manca et al. | |
| D700,397 S | 2/2014 | Manca et al. | |
| 8,684,172 B2 | 4/2014 | Yao | |
| 8,689,804 B2 | 4/2014 | Fernando et al. | |
| 8,781,307 B2 | 7/2014 | Buzzetti | |
| 8,794,245 B1 | 8/2014 | Scatterday | |
| 8,794,434 B2 | 8/2014 | Scatterday et al. | |
| D715,760 S | 10/2014 | Kim et al. | |
| D716,267 S | 10/2014 | Kim et al. | |
| D720,884 S | 1/2015 | Liu | |
| D723,738 S | 3/2015 | Liu | |
| 8,975,764 B1 | 3/2015 | Abehasera | |
| 8,978,663 B2 | 3/2015 | Newton | |
| D736,460 S | 8/2015 | Mckeon et al. | |
| D737,507 S | 8/2015 | Liu | |
| 9,302,825 B2 | 4/2016 | Liu | |
| 9,499,332 B2 | 11/2016 | Fernando et al. | |
| 9,603,388 B2 | 3/2017 | Fernando et al. | |
| 10,130,119 B2 | 11/2018 | Murison | |
| 10,218,193 B2 | 2/2019 | Gratton | |
| 10,750,779 B2 * | 8/2020 | Schennum | A24F 40/90 |
| 10,770,913 B2 | 9/2020 | Schennum et al. | |
| 2002/0005207 A1 | 1/2002 | Wrenn et al. | |
| 2003/0063523 A1 | 4/2003 | Mulaw | |
| 2006/0196518 A1 | 9/2006 | Hon | |
| 2007/0074734 A1 | 4/2007 | Braunshteyn et al. | |
| 2008/0121244 A1 | 5/2008 | Bryman et al. | |
| 2009/0051326 A1 | 2/2009 | Wang et al. | |
| 2009/0096430 A1 | 4/2009 | Van et al. | |
| 2009/0283103 A1 | 11/2009 | Nielsen et al. | |
| 2010/0126505 A1 | 5/2010 | Rinker | |
| 2010/0307518 A1 | 12/2010 | Wang | |
| 2010/0313901 A1 | 12/2010 | Stahle et al. | |
| 2011/0162663 A1 | 7/2011 | Bryman | |
| 2011/0180433 A1 | 7/2011 | Rennecamp | |
| 2011/0203600 A1 | 8/2011 | Bardelli et al. | |
| 2011/0226266 A1 | 9/2011 | Tao | |
| 2011/0265806 A1 | 11/2011 | Alarcon et al. | |
| 2011/0277780 A1 | 11/2011 | Terry et al. | |
| 2012/0160251 A1 | 6/2012 | Hammel et al. | |
| 2012/0211014 A1 | 8/2012 | Bardelli | |
| 2012/0227753 A1 * | 9/2012 | Newton | A24F 40/95 131/347 |
| 2012/0255567 A1 | 10/2012 | Rose et al. | |
| 2013/0037042 A1 | 2/2013 | Hearn et al. | |
| 2013/0098786 A1 | 4/2013 | Collins | |
| 2013/0298922 A1 | 11/2013 | Xiang et al. | |
| 2013/0300350 A1 | 11/2013 | Xiang | |
| 2013/0314055 A1 | 11/2013 | Van Der Linde et al. | |
| 2013/0333711 A1 | 12/2013 | Liu | |
| 2013/0340778 A1 | 12/2013 | Liu | |
| 2013/0341218 A1 | 12/2013 | Liu | |
| 2013/0342157 A1 | 12/2013 | Liu | |
| 2014/0007892 A1 | 1/2014 | Liu | |
| 2014/0014124 A1 | 1/2014 | Glasberg et al. | |
| 2014/0014125 A1 | 1/2014 | Fernando et al. | |
| 2014/0020697 A1 | 1/2014 | Liu | |
| 2014/0053858 A1 | 2/2014 | Liu | |
| 2014/0083443 A1 | 3/2014 | Liu | |
| 2014/0096782 A1 | 4/2014 | Ampolini et al. | |
| 2014/0097103 A1 | 4/2014 | Cameron | |
| 2014/0107815 A1 | 4/2014 | Lamothe | |
| 2014/0123990 A1 | 5/2014 | Timmermans | |
| 2014/0196731 A1 | 7/2014 | Scatterday | |
| 2014/0196736 A1 | 7/2014 | Fernando et al. | |
| 2014/0286002 A1 | 9/2014 | Liu | |
| 2014/0348495 A1 | 11/2014 | Greim | |
| 2015/0015186 A1 | 1/2015 | Xiang | |
| 2015/0020831 A1 | 1/2015 | Weigensberg et al. | |
| 2015/0020832 A1 | 1/2015 | Greim et al. | |
| 2015/0059785 A1 | 3/2015 | Liu | |
| 2015/0114410 A1 | 4/2015 | Doster | |
| 2015/0128971 A1 | 5/2015 | Verleur et al. | |
| 2015/0128975 A1 * | 5/2015 | Alarcon | H02J 7/0044 131/329 |
| 2015/0128976 A1 * | 5/2015 | Verleur | A24F 40/90 131/329 |
| 2015/0173419 A1 | 6/2015 | Tu | |
| 2015/0201676 A1 | 7/2015 | Shin | |
| 2015/0245654 A1 | 9/2015 | Memari et al. | |
| 2015/0245668 A1 | 9/2015 | Memari et al. | |
| 2015/0296885 A1 | 10/2015 | Liu | |
| 2015/0333542 A1 | 11/2015 | Alarcon et al. | |

(56) References Cited

U.S. PATENT DOCUMENTS

| | | | |
|---|---|---|---|
| 2015/0333552 | A1 | 11/2015 | Alarcon |
| 2015/0333561 | A1 | 11/2015 | Alarcon |
| 2016/0226286 | A1 | 8/2016 | Xiang |
| 2016/0250201 | A1 | 9/2016 | Rose et al. |
| 2016/0278436 | A1 | 9/2016 | Verleur et al. |
| 2016/0374390 | A1 | 12/2016 | Liu |
| 2017/0027221 | A1 | 2/2017 | Liu |
| 2017/0086502 | A1 | 3/2017 | Hearn et al. |
| 2017/0114965 | A1 | 4/2017 | Maglica et al. |
| 2017/0207499 | A1 | 7/2017 | Leadley |
| 2017/0208865 | A1 | 7/2017 | Nettenstrom et al. |
| 2017/0214261 | A1* | 7/2017 | Gratton ............... H02J 7/00714 |
| 2017/0222468 | A1 | 8/2017 | Schennum et al. |
| 2018/0199618 | A1 | 7/2018 | Fuisz et al. |
| 2019/0157887 | A1 | 5/2019 | Gratton |
| 2019/0190088 | A1 | 6/2019 | Leadley |
| 2020/0127478 | A1 | 4/2020 | Gratton |

FOREIGN PATENT DOCUMENTS

| | | | |
|---|---|---|---|
| CA | 2862045 | A1 | 7/2013 |
| CN | 201290340 | Y | 8/2009 |
| CN | 201299102 | Y | 9/2009 |
| CN | 201341434 | Y | 11/2009 |
| CN | 201384062 | Y | 1/2010 |
| CN | 201571500 | U | 9/2010 |
| CN | 101869356 | A * | 10/2010 ............ A24F 47/008 |
| CN | 201813848 | U | 5/2011 |
| CN | 201928066 | U | 8/2011 |
| CN | 202122096 | U | 1/2012 |
| CN | 202679020 | U | 1/2013 |
| CN | 102970885 | A | 3/2013 |
| CN | 203416029 | U | 1/2014 |
| CN | 203481880 | U | 3/2014 |
| CN | 203481882 | U | 3/2014 |
| CN | 203491727 | U | 3/2014 |
| CN | 203491758 | U | 3/2014 |
| CN | 203504217 | U | 3/2014 |
| CN | 203504250 | U | 3/2014 |
| CN | 203537022 | U | 4/2014 |
| CN | 203554013 | U | 4/2014 |
| CN | 103798960 | A | 5/2014 |
| CN | 203633510 | U | 6/2014 |
| CN | 203633514 | U | 6/2014 |
| CN | 203662028 | U | 6/2014 |
| CN | 203689071 | U | 7/2014 |
| CN | 204838006 | U * | 12/2015 |
| EA | 013849 | B1 | 8/2010 |
| EP | 2253233 | A1 | 11/2010 |
| EP | 2157873 | B1 | 7/2011 |
| EP | 2573900 | A1 | 3/2013 |
| EP | 2668858 | A1 | 12/2013 |
| EP | 1848483 | B1 | 3/2014 |
| EP | 3171720 | A1 | 5/2017 |
| GB | 1046183 | | 7/1988 |
| GB | 2068034 | | 11/1997 |
| GB | 4000273 | | 12/2006 |
| GB | 4006615 | | 10/2008 |
| GB | 2514893 | A | 12/2014 |
| KR | 200448273 | Y1 | 3/2010 |
| KR | 20110003475 | U | 4/2011 |
| KZ | 27104 | B | 6/2013 |
| RU | 103281 | U1 | 4/2011 |
| RU | 2489948 | C2 | 8/2013 |
| UA | 104628 | C2 | 2/2014 |
| WO | 2006082571 | A1 | 8/2006 |
| WO | 2011146315 | A2 | 11/2011 |
| WO | 2011146330 | A2 | 11/2011 |
| WO | 2013102612 | A2 | 7/2013 |
| WO | 2014017794 | A1 | 1/2014 |
| WO | 2014066730 | A1 | 5/2014 |
| WO | 2015150759 | A1 | 10/2015 |
| WO | 2016012795 | A1 | 1/2016 |

OTHER PUBLICATIONS

Chinese Office Action, Application No. 2015800170791, dated May 3, 2018, 15 pages.
Chinese Office Action, Application No. 201580018258.7, dated May 3, 2018, 15 pages.
Chinese Office Action, Application No. 201580040920.9, dated Aug. 28, 2018, 10 pages.
Chinese Search Report, Application No. 2015800170791, dated Apr. 24, 2018, 2 pages.
Communication pursuant to Article 94(3) EPC for Application No. 18199904.6, mailed on Apr. 30, 2021, 8 pages.
EP Search Report, Application No. GB1413127.7, dated Jan. 22, 2015, 5 pages.
European Extended Search Report, Application No. 18199904.6, dated Mar. 13, 2019, 16 pages.
European Notice of Opposition, Application No. EP 15744297.1, dated Aug. 1, 2019, 100 pages.
Examination Report mailed Sep. 27, 2017, for Great Britain Application No. GB1413429.0, 3 pages.
Examination Report under Section 18(3) for Great Britain Application No. 1413124.7, mailed on Jul. 30, 2020, 7 pages.
Great Britain Examination Report, Application No. GB1413429.0, dated May 1, 2018, 4 pages.
International Preliminary Report on Patentability for Application No. PCT/GB2015/052129, mailed on Jan. 24, 2017, 7 pages.
International Preliminary Report on Patentability for corresponding International Application No. PCT/GB2015/050956 mailed on Jul. 8, 2016, 16 pages.
International Search Report and Written Opinion, International Application No. PCT/GB2015/052129, mailed Sep. 7, 2015, 10 pages.
International Search Report for corresponding International Application No. PCT/GB2015/050956 mailed on Jul. 24, 2015, 5 pages.
International Search Report for corresponding International Application No. PCT/GB2015/050957 mailed on Jul. 24, 2015, 6 pages.
Mckean, et al., Application and File History for U.S. Design Patent No. D736,460, issued Aug. 11, 2015, 234 pages.
Nettenstrom, Application and File History for U.S. Appl. No. 15/328,730, filed Jan. 24, 2017.
Notification of International Preliminary Report on Patentability, Application No. PCT/GB2015/050957, dated Oct. 13, 2016, 9 pages.
Office Action dated Oct. 19, 2018 for Chinese Application No. 201580041176.4, 5 pages.
Office Action dated Sep. 3, 2014, for Russian Application No. 2013504605, 7 pages.
Office Action for Chinese Application No. 201910271285.5, mailed on Mar. 30, 2021, 12 pages.
Office Action For Chinese Application No. 201910271285.5, mailed on Oct. 8, 2021, 10 pages.
Office Action mailed Apr. 5, 2018 for U.S. Appl. No. 15/328,730, 25 pages.
Office Action mailed Mar. 6, 2020 for European Application No. EP3171720, 16 pages.
Reply to Appeal for European Patent No. 3171720, mailed on Nov. 29, 2021, 47 pages.
Russian Decision to Grant, Application No. 2016138630, dated Dec. 21, 2017, 9 pages.
Russian Decision to Grant, Application No. 2017102047/07, dated Mar. 20, 2018, 13 pages.
Russian Decision to Grant, Application No. 2018117145/12, dated May 15, 2019, 11 pages.
Schennum, Application and File History for U.S. Appl. No. 15/301,105, filed Sep. 30, 2016.
Schennum, Application and File History for U.S. Appl. No. 15/328,099, filed Jan. 23, 2017.
Schennum, et al., Application and File History for U.S. Appl. No. 15/301,178, filed Sep. 30, 2016, 455 pages.
Schennum, et al., Application and File History for U.S. Appl. No. 16/263,362, filed Jan. 31, 2019, 303 pages.
Search Report for corresponding GB Application No. 1405719.4 mailed on Aug. 29, 2014, 4 pages.

(56) References Cited

OTHER PUBLICATIONS

Search Report for corresponding GB Application No. 1405721.0 mailed on Sep. 23, 2014, 5 pages.
Search Report mailed May 3, 2018 for Chinese Application No. 2015800170791, 2 pages.
Summons to Attend Oral Proceedings Pursuant to Rule 115(1) EPC for European Application No. 18199904.6, mailed on Mar. 4, 2022, 8 pages.
Translation of Russian Search Report, Application No. 2017101966, dated Jan. 30, 2018, 2 pages.
Written Opinion for corresponding International Application No. PCT/GB2015/050956 mailed on Jul. 24, 2015, 8 pages.
Written Opinion for corresponding International Application No. PCT/GB2015/050957 mailed on Jul. 24, 2015, 7 pages.

\* cited by examiner

RE-CHARGING PACK FOR AN E-CIGARETTE

CROSS-REFERENCE TO RELATED APPLICATIONS

The present application is a continuation of U.S. patent application Ser. No. 16/947,153, filed Jul. 21, 2020, which in turn is a continuation application of U.S. patent application Ser. No. 15/301,178, filed Sep. 30, 2016, now issued as U.S. Pat. No. 10,750,779, issued Aug. 25, 2020, which is a National Phase entry of PCT Application No. PCT/GB2015/050957, filed on Mar. 30, 2015, which claims priority to GB Patent Application No. 1405719.4, filed on Mar. 31, 2014, each of which is hereby fully incorporated herein by reference.

TECHNICAL FIELD

The present application relates to a re-charging pack for an e-cigarette, such as an electronic vapor provision system or an electronic nicotine delivery system.

BACKGROUND

Electronic vapor provision systems, electronic nicotine delivery systems, etc., which are collectively referred to herein as e-cigarettes, generally contain a reservoir of liquid which is to be vaporized. When a user sucks or draws on the device, this activates a heater to vaporize a small amount of liquid, which is then inhaled by the user. Most e-cigarettes include a re-chargeable battery for supplying electrical power to the heater and other electrical/electronic components, such as a sensor to detect inhalation. Some e-cigarettes have a cartridge section. After the nicotine or other liquid in this cartridge has been exhausted, the empty cartridge can be removed or separated from the e-cigarette and replaced with a new cartridge containing further nicotine.

E-cigarettes are often supplied in packs for protection and easy portability. Such packs may accommodate multiple e-cigarettes and/or replacement cartridges, thereby offering a backup facility if one e-cigarette (or its cartridge) is exhausted. An e-cigarette pack may also have the ability to re-charge an e-cigarette, again helping to ensure good operating availability of the e-cigarette for a user. Typically a pack is provided with a cylindrical hole for receiving an e-cigarette for recharging, the hole generally reflecting the elongated, cylindrical shape of an e-cigarette. When the e-cigarette is located in the hole, the battery can be re-charged by a suitable wired or wireless connection (a wireless connection may rely upon induction charging). In some packs, the cylindrical hole may receive the entire e-cigarette for re-charging, while in other packs only a portion of the e-cigarette may be received into the hole.

In some devices, the pack must be connected to a power supply, e.g. a mains outlet or USB connection, during re-charging of the e-cigarette battery. In this case, the pack is typically acting as a convenient device for holding and interfacing to the e-cigarette during re-charging. In other devices, the pack itself is provided with a battery (or other charge storage facility). The pack battery allows the e-cigarette to be re-charged from the pack without the need for the pack to be connected to an external power supply during the re-charging, thereby providing greater convenience for a user.

The pack battery will of course be depleted in due course, and so is generally provided with its own re-charging facility—typically again reliant upon some form of mains or USB connection. However, since the pack is larger than an e-cigarette, it can accommodate a larger battery and therefore the pack does not have to be re-charged as frequently as an e-cigarette. For example, the charge capacity of a typical e-cigarette battery may be approximately 60 mAh, whereas the charge capacity of a typical pack battery might be in the region of 800 mAh. Accordingly, the pack battery is capable of re-charging the e-cigarette a few times at least before the pack battery itself needs to be re-charged.

Such a multiple or hierarchical arrangement of separately chargeable systems, namely firstly an e-cigarette and secondly a pack for the e-cigarette, is relatively rare. In contrast, most re-chargeable devices, e.g. mobile (cell) phones, are usually connected directly to a mains-powered charging supply (or else to an in-car charging supply). It is desirable for the (re)charging of an e-cigarette and associated pack to be as reliable and convenient for a user as possible.

SUMMARY

A pack is provided for holding and re-charging an e-cigarette. The pack comprises a first tube having a substantially cylindrical shape, the first tube having a hole defined by an open end of the first tube for receiving an e-cigarette into the first tube to be held therein. The pack further includes a re-charging mechanism for re-charging the e-cigarette held within the first tube, and a light for indicating a charging state of the e-cigarette held within the first tube. The light is located at the open end of said first tube adjacent the hole for receiving the e-cigarette into the first tube.

The present approach is not restricted to specific embodiments such as set out herein, but features from different embodiments may be combined, modified, omitted or replaced by the skilled person according to the circumstances of any given implementation.

BRIEF DESCRIPTION OF THE DRAWINGS

Various embodiments will now be described in detail by way of example only with reference to the following drawings:

FIG. 5 is a perspective view showing the annular light element as fitted into the insert; FIG. 6 is an exploded view showing the annular light element and insert disassembled; and FIG. 7 is a cross-section in a vertical plane through the annular light element as fitted into the insert.

DETAILED DESCRIPTION

Figure 1:
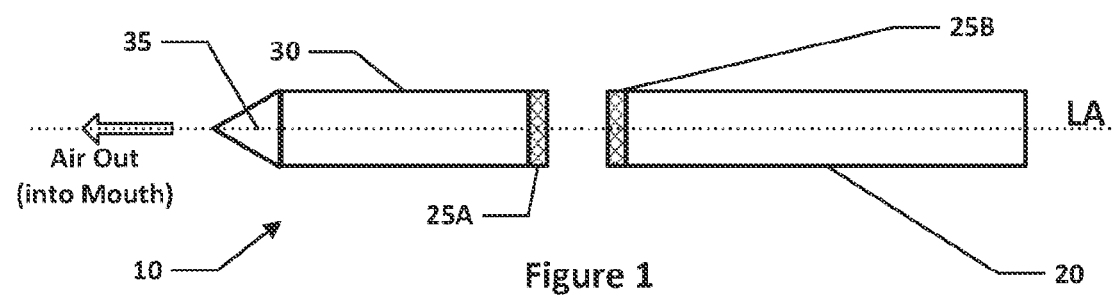
FIG. 1 is a schematic (exploded) diagram of an e-cigarette in accordance with some embodiments of the disclosure.

FIG. 1 is a schematic diagram of an e-cigarette 10 in accordance with some embodiments of the disclosure (not to scale). The e-cigarette 10 has a generally cylindrical shape, extending along a longitudinal axis indicated by dashed line LA, and comprises two main components, namely a body 20 and a cartomizer 30. The cartomizer 30 includes an internal chamber containing a reservoir of nicotine, a vaporizer (such as a heater), and a mouthpiece 35. The reservoir may be a foam matrix or any other structure for retaining the nicotine until such time that it is required to be delivered to the vaporizer. The cartomizer 30 also includes a heater for vaporizing the nicotine and may further include a wick or similar facility to transport a small amount of nicotine from the reservoir to a heating location on or adjacent the heater.

The body 20 includes a re-chargeable cell or battery to provide power to the e-cigarette 10 and a circuit board for generally controlling the e-cigarette. When the heater receives power from the battery, as controlled by the circuit board, the heater vaporizes the nicotine and this vapor is then inhaled by a user through the mouthpiece.

The body 20 and cartomizer 30 are detachable from one another by separating along the longitudinal axis LA, as shown in FIG. 1, but are joined together when the device 10 is in use by a connection, indicated schematically in FIG. 1 as 25A and 25B, to provide mechanical and electrical connectivity between the body 20 and the cartomizer 30. The electrical connector on the body 20 that is used to connect to the cartomizer may also serve as a socket for connecting to a charging device (not shown) when the body is detached from the cartomizer 30.

The e-cigarette 10 is provided with one or more holes (not shown in FIG. 1) for air inlet. These holes connect to an air passage through the e-cigarette 10 to the mouthpiece 35. When a user inhales through the mouthpiece 35, air is drawn into this air passage through the one or more air inlet holes, which are suitably located on the outside of the e-cigarette 10. This airflow (or the resulting change in pressure) is detected by a pressure sensor that in turn activates the heater to vaporize the nicotine from the cartridge. The airflow passes through, and combines with, the nicotine vapor, and this combination of airflow and nicotine vapor then passes out of the mouthpiece 35 to be inhaled by a user. The cartomizer 30 may be detached from the body 20 and disposed of when the supply of nicotine is exhausted (and replaced with another cartomizer if so desired).

It will be appreciated that the e-cigarette 10 shown in FIG. 1 is presented by way of example, and various other implementations can be adopted. For example, in some embodiments, the cartomizer 30 is provided as two separable components, namely a cartridge comprising the nicotine reservoir and mouthpiece (which can be replaced when the nicotine from the reservoir is exhausted), and a vaporizer comprising a heater (which is generally retained). In other embodiments, the e-cigarette 10, the body 20 and the cartomizer 30 may be joined together permanently, so in effect they are just a single component. Some such unitary (one-piece) e-cigarettes may allow replenishing of a nicotine reservoir when exhausted using some suitable (re)supply mechanism; other one-piece e-cigarettes may be disposed of once the nicotine reservoir has been exhausted. Note that this latter type of device still generally supports re-charging because the battery will normally become depleted more quickly than the nicotine reservoir. The skilled person will be aware of many further possible designs and implementations of an e-cigarette.

Figure 2:
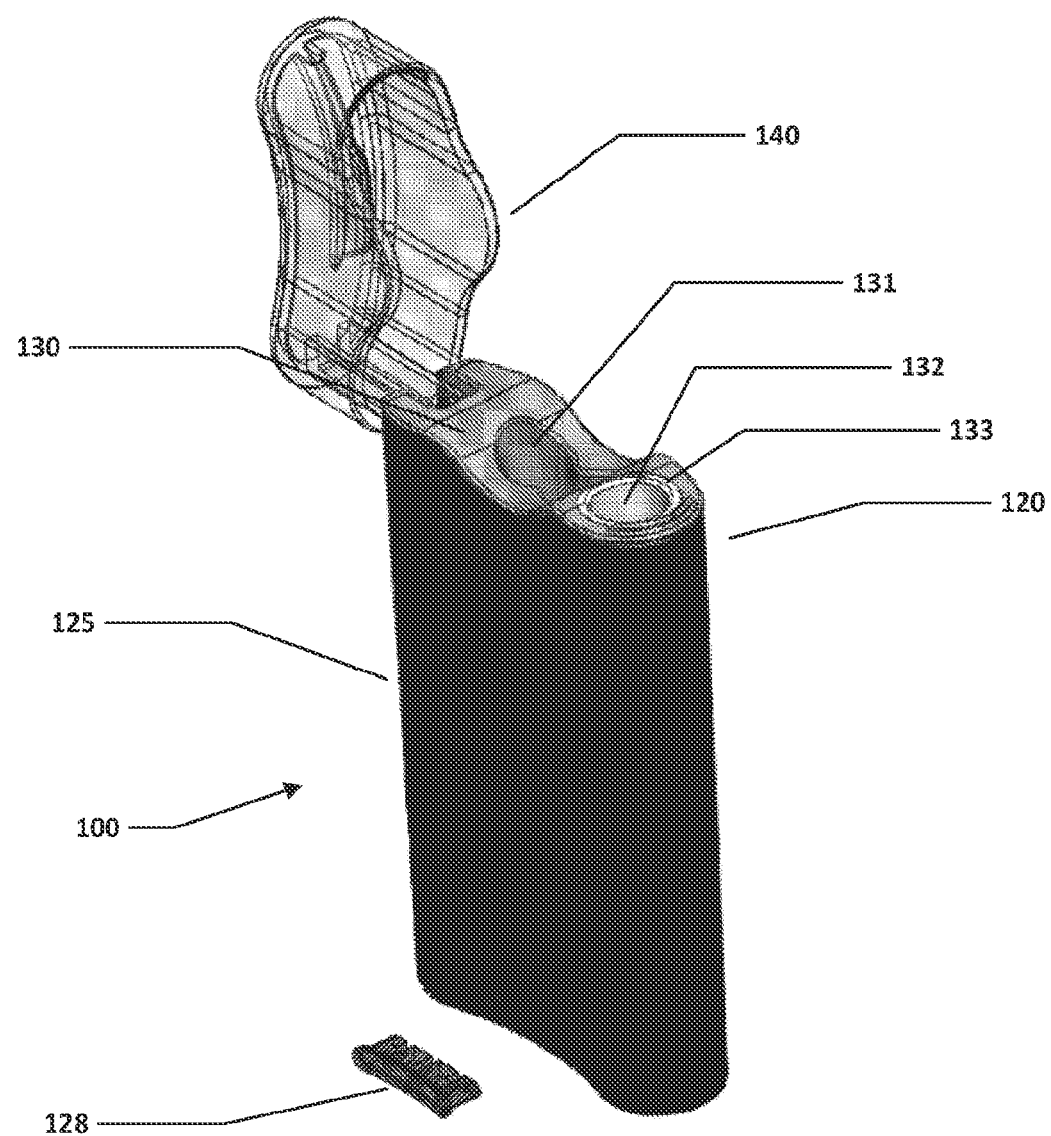
FIG. 2 illustrates a pack 100 for receiving and accommodating an e-cigarette in accordance with some embodiments of the disclosure.

FIG. 2 illustrates a pack 100 for receiving and accommodating an e-cigarette in accordance with some embodiments of the invention. The pack 100 comprises a body 120 which is provided with a hinged lid 140 that can open and close. The body 120 comprises an outer case or housing 125 which is fitted with an insert 130. More particularly, the outer case 125 has an opening at the top, i.e. the end at which the lid is located, and the insert 130 is fitted into, and generally closes, this opening. The insert 130 itself is provided with two openings or holes that extend down into the body 120 of the pack 100. The first opening 132 comprises a substantially circular hole (in terms of cross-sectional shape). The first opening 132 is surrounded by an annular light element 133, as described in more detail below. The second opening 131 in the insert comprises a pair of linked holes (only one of which is easily visible in FIG. 2). The openings 132 and 131 (and more particularly, each of the pair of holes formed by opening 131) can be used to receive an appropriately shaped object, such as an e-cigarette, a spare or used cartridge, etc. The dimensions of pack 100 are generally arranged so that an e-cigarette accommodated within openings 132 or 131 protrudes slightly out of this opening. This allows a user to readily discern the contents of pack 100 (as also helped by making lid 140 transparent), and also facilitates removal by a user of an e-cigarette located within one of these openings.

The pack 100 is further provided with a set of LED lights 128. These are shown separated from the casing 125 in FIG. 2 in an exploded view, but in the assembled pack are integrated into the body 120 so as to lie flush with the outer casing 125. These LED lights 128 can be used to indicate the charging state of the pack 100, for example, whether it is fully charged, partly charged, or fully discharged. The LEDs lights 128 may also be used to indicate whether or not the pack 100 is currently charging (being charged). Such charging may be accomplished via a (mini or micro) USB link using a (mini or micro) USB connector located on the underside of the pack 100 (not visible in FIG. 2).

Figure 3:
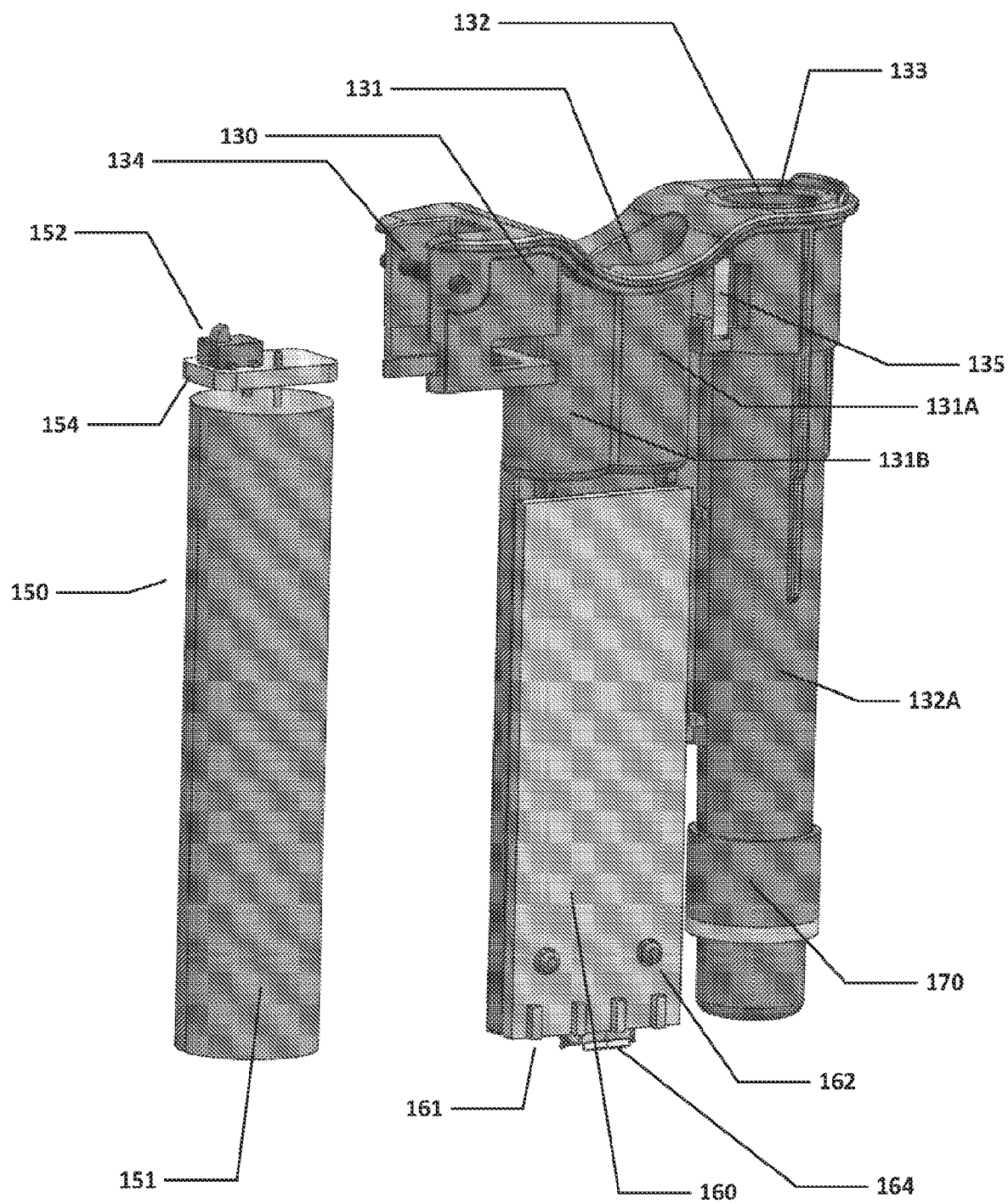
FIG. 3 illustrates the main internal components of the pack of FIG. 2 in accordance with some embodiments of the disclosure.

FIG. 3 illustrates the main components that are housed within the body 120 of the pack 100, more particularly, within housing 125, in accordance with some embodiments of the invention (some minor components, such as internal wiring, are omitted for reasons of clarity). The body 120 includes a battery unit 150 comprising a battery 151, a printed circuit board (PCB) 154, and a switch 152. For clarity, the battery unit 150 is shown separated from the insert 130, however, in practice the two are assembled together. The body 120 can be seen to include a hinge or axle 134, which provides a pivot about which the lid 140 is able to open and shut. The battery unit 150, including the switch 152, is located substantially below the hinge 134.

As illustrated in FIG. 3, the insert 130 extends substantially to the bottom of the outer casing 125. The insert 130 defines a substantially cylindrical tube 132A extending down from opening 132, which is able to receive and hold an e-cigarette. The insert 130 further includes two further substantially cylindrical tubes 131A, 131B, which overlap one another, extending down from opening 131 with a "figure-of-8" cross-section. Note that the bottom of tubes 132A, 131A and 131B may be closed by the insert itself 130, or may be open, but abutting against the bottom of the outer casing 125, which would then have the effect of again closing the bottom of the tubes 132A, 131A and 131B in order to retain an e-cigarette (or other item, such as a spare cartridge, therein).

Note that the battery 151 is relatively large—comparable in size, for example, with the opening 132 and associated tube 132A for receiving an e-cigarette. Consequently the battery 151 of the pack 100 will usually have significantly greater electrical storage capacity than a battery provided in an e-cigarette which may be accommodated within the pack. This allows the battery in the e-cigarette to be re-charged, typically several times, using the battery unit 150 of pack 100, without the need for any additional, external power supply (such as a mains connection). This can be very convenient for a user, who may be in a location or situation which does not provide a ready connection to the mains.

In order to support this re-charging of an e-cigarette stored within the pack 100, a portion of the tube 132A is provided with a coil 170 which is coaxial with the tube 132A and forms in effect a collar or sleeve around the tube 132A. This tube is used to perform induction charging of an e-cigarette located in the tube 132A. Alternatively, the tube 132A may be provided with a suitable electrical contact at its base (or elsewhere) to provide a wired power supply for an e-cigarette (or portion thereof) inserted into the tube 132A. For example, in some embodiments, the body portion 20 of e-cigarette 10 such as shown in FIG. 1 might be inserted into tube 132A for re-charging via connector 25B. In such an embodiment, tube 132A may be reduced in length so that some portion of the body 20 protrudes from the top of tube 132A, thereby facilitating easier removal of the body from the tube. In this case, the tube 132A may or may not be able to accommodate a fully assembled e-cigarette (but this can be facilitated by providing increased space (depth) in lid 140).

The insert 130 is provided with two printed circuit boards (PCBs), 135 and 160. The PCB 160 provides the main control functionality of the pack, as will be described in more detail below, and is attached to tubes 131A, 131B by pegs that extend outwards from the walls of tube 131A, 131B through corresponding holes 162 in the PCB 160, thereby retaining the PCB in the appropriate position relative to the tubes 131A, 131B. A mini-USB (or micro-USB) connector 164 is provided at the bottom of the PCB 160, and is accessible through a corresponding aperture in the underside of the housing 125 of the pack body 120. This USB connector can be used to connect an external power supply to the pack 100 for re-charging the battery 151 (and also any e-cigarette located in hole 132A). The USB connector may also be used, if so desired, for communications with the electronics of the e-cigarette, for example to update software on the PCB 160 and/or to download usage data from the PCB, etc. The PCB 160 is further provided with a set of physical and mechanical connectors 161 for retaining and operating the LED lighting 128. In particular, the PCB 160 controls the LED lighting element 128 to provide an indication to a user about the current charging situation of the pack 100, plus any other suitable information.

The other PCB 135 associated with the insert 130 is located on the outside of re-charging tube 132A, relatively near the top, i.e. closer to the hole or opening 132 for receiving an e-cigarette for re-charging. This PCB 135 incorporates at least one light emitting diode (LED), which is used to illuminate the annular light element 133, as described in more detail below.

It will be appreciated that the configuration and arrangement of the pack 100 and insert 130 shown in FIGS. 2 and 3 are provided by way of example, and the skilled person will be aware of many potential variations—e.g. the number, position, size and/or shape of holes 131, 132 may vary from one embodiment to another, likewise the associated tubes 131A, 131B, 132A. Similarly, the details of the positioning, shape and size of the battery unit 150, PCB 160, and other components will generally vary from one embodiment to another, depending upon the particular circumstances and requirements of any given implementation.

Figure 4:
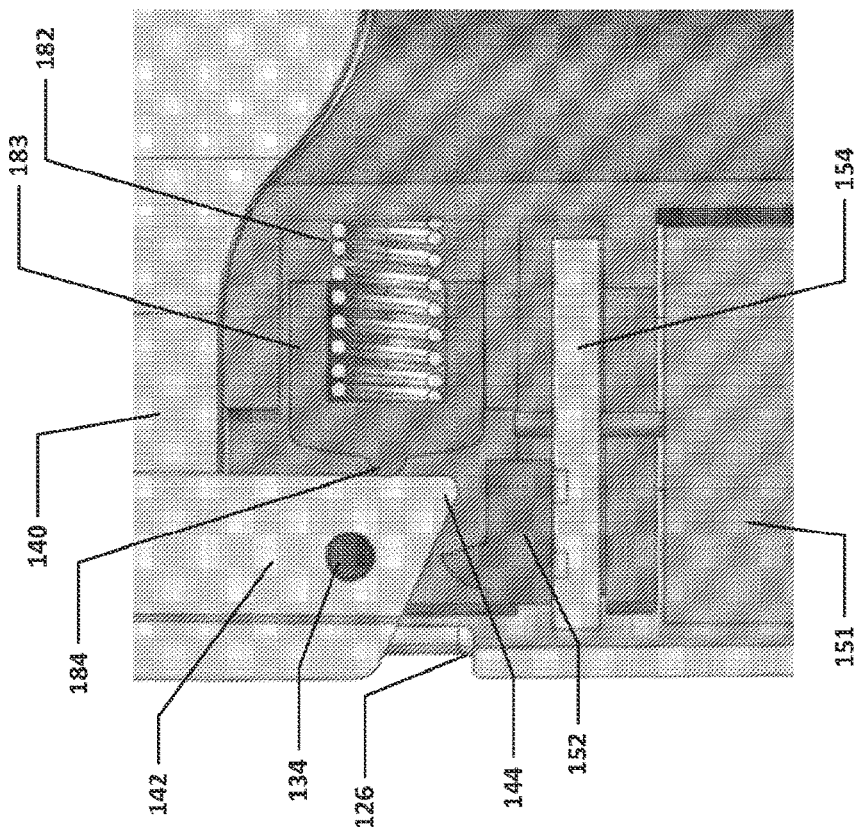
FIG. 4 illustrates a detail of the pack of FIG. 2, especially regarding the operation of the lid, in accordance with some embodiments of the disclosure.

FIG. 4 illustrates a detail of the pack 100 in terms of the operation of the action of the lid 140 as it rotates open and shut about hinge 134. In particular, FIG. 4 comprises a cross-section view through the pack 100 in a vertical plane in accordance with some embodiments of the disclosure. The insert 130 is provided with a biasing unit comprising a coil spring 182 and a cap 183, the end of which is emphasized by a protruding nipple 184. As the lid 140 is rotated open from the closed position shown in FIG. 4, the lid arm 142 pivots in counter-clockwise fashion about hinge (axle) 134. This rotation causes the arm 142 to push against the cap 183, thereby tending to compress spring 182, which therefore opposes this initial stage of the rotation of the lid. However, once the corner 144 of the arm 142 which is furthest from the hinge 134 has passed the nipple 184 on the cap, further rotation of the lid in an opening direction allows the spring 182 to expand again. In other words, the spring 182 encourages this later stage of rotation (which continues until the arm 142 reaches a mechanical stop, provided by the top rim or ledge 126 of the outer casing 125). This two-stage effect of the spring 182 provides an over-centre biasing mechanism with respect to the opening of the lid 140, in effect driving the lid to one of two favored positions—either fully open or fully shut.

The rotational movement of the lid arm 142 between the open and shut positions also results in a mechanical engagement between the lid arm 142 and the switch 152 attached to the PCB. In particular, opening and closing of the lid activate the switch 152 in opposite directions, thereby allowing the control system of the pack to use the state of switch 152 to determine whether the lid of the pack is open or shut.

Figure 5:
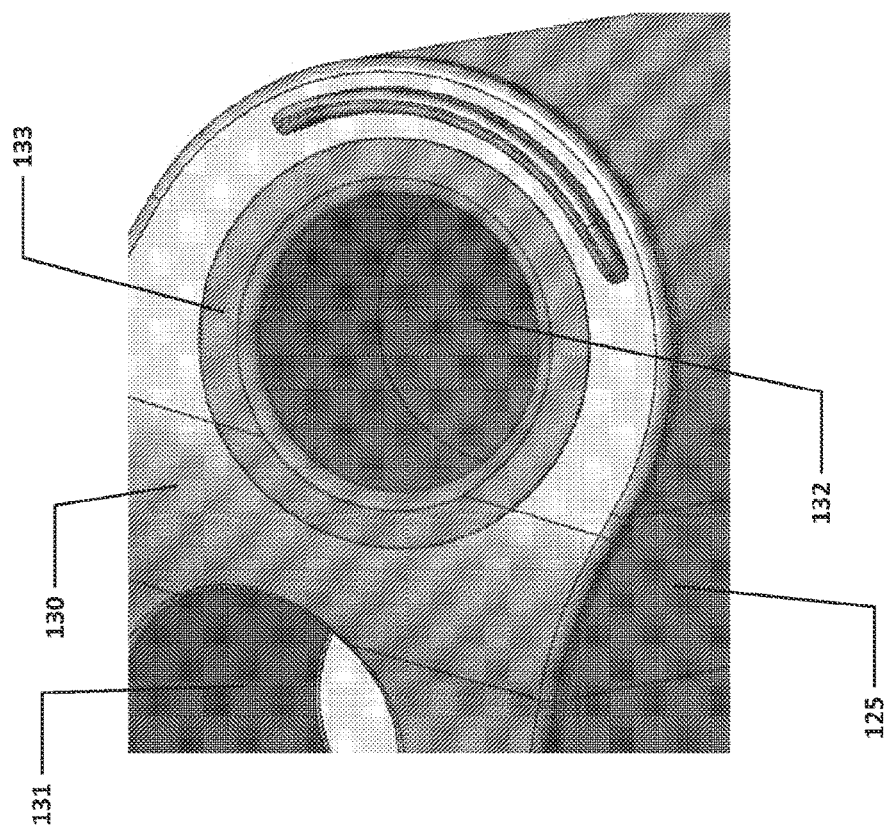
FIGS. 5, 6 and 7 illustrate in more detail the annular light element and the insert from the pack of FIG. 2 in accordance with some embodiments of the disclosure. In particular.
Figure 7:
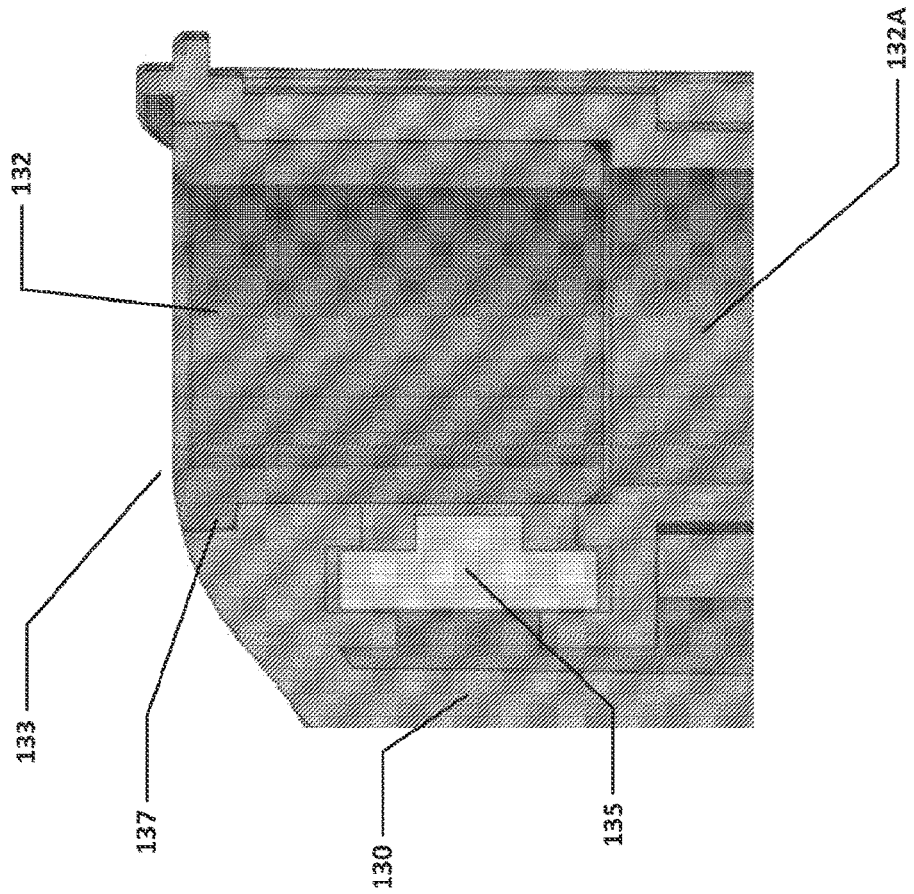
Figure 6:
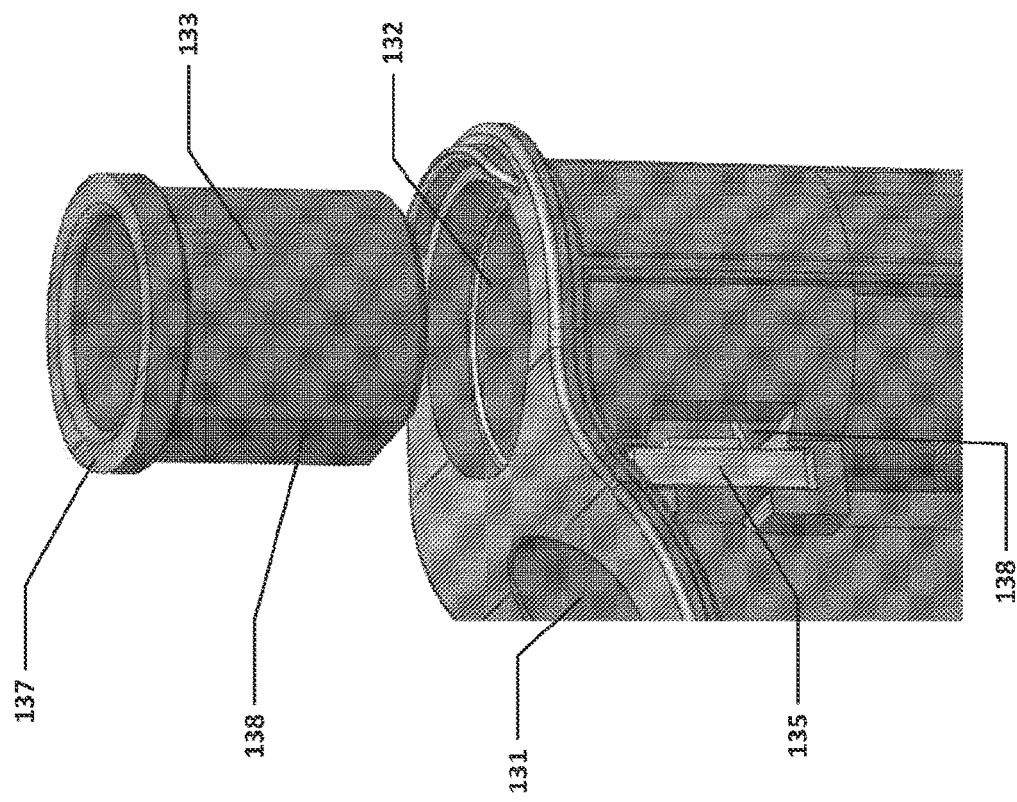

FIGS. 5, 6 and 7 illustrate in more detail the annular light element 133 and its relationship to the insert 130 in accordance with some embodiments of the disclosure. In particular, FIG. 5 is a perspective view showing the annular light element 133 as fitted into the insert 130 (and also outer case 125); FIG. 6 is an exploded view showing the annular light element 133 and insert 130 disassembled; and FIG. 7 is a cross-section in a vertical plane through the annular light element 133 as fitted into the insert 130.

The annular light element 133 is in the shape of a tube or sleeve. The inner surface of this tube comprises a cylinder of circular cross-section and is sized to receive an e-cigarette for storage and/or re-charging. The outer surface of the tube is likewise generally a cylinder of circular cross-section, but has two additional features. The first is a lip or rim 137 directed radially outwards at the top of the annular light element (assuming the normal orientation of pack 100, whereby the lid is at the top, and an e-cigarette 10 would be inserted downwards through opening 132). This lip rests on a corresponding ledge formed at the top of tube 132A, adjacent opening 132, and the lip and ledge cooperate to maintain the annular light element at the correct position within the tube 132A—i.e. so that the annular light element does not disappear further down into the tube 132A. The lip also helps to provide a greater light emitting area, as described in more detail below.

The second additional feature is a flattened or planar surface 138, which in a horizontal plane forms a chord with respect to the otherwise circular outer cross-section of the annular light element. This flattened surface 138 helps to prevent rotation of the angular light element 133 within tube 132A in an azimuthal direction about the axis of tube 132A (which is coaxial with the axis of the annular light element, and also an inserted e-cigarette).

The flattened surface 138 is positioned facing and immediately adjacent to the PCB 135 which incorporates at least one light emitting diode (LED). As noted above, this LED is used to illuminate the annular light element 133. This transfer of light from the LED into the annular light element 133 is facilitated by the flattened surface 138 of the annular light element 133, since it allows a greater surface area of the annular light element 133 to be positioned close to the LED. The light transfer is also facilitated by a slot or aperture 138 which is cut into the wall of the tube 132A (see FIG. 6). In particular, the aperture 138 allows the LED provided by the PCB 135 to protrude into and through the wall of the tube 132A, and hence to lie immediately adjacent the annular light element 133.

The annular light element 133 is formed of a transparent or translucent material which allows light from the LED to spread through the material of the annular light element. This light is able to exit through the top of the annular light element, and hence is visible to a user. It will be appreciated that lip 137 helps to expose a greater surface area of the annular light element 133 for this emission of light, thereby increasing visibility to a user.

The annular light element provides an indication to the user of the charging state of an e-cigarette inserted into the tube 132A. In particular, the PCB 135 is controlled to illuminate the LED according to various predetermined criteria relating to the charging state of the e-cigarette, thereby providing the user with direct visual information relating to this charging state.

Figure 8:
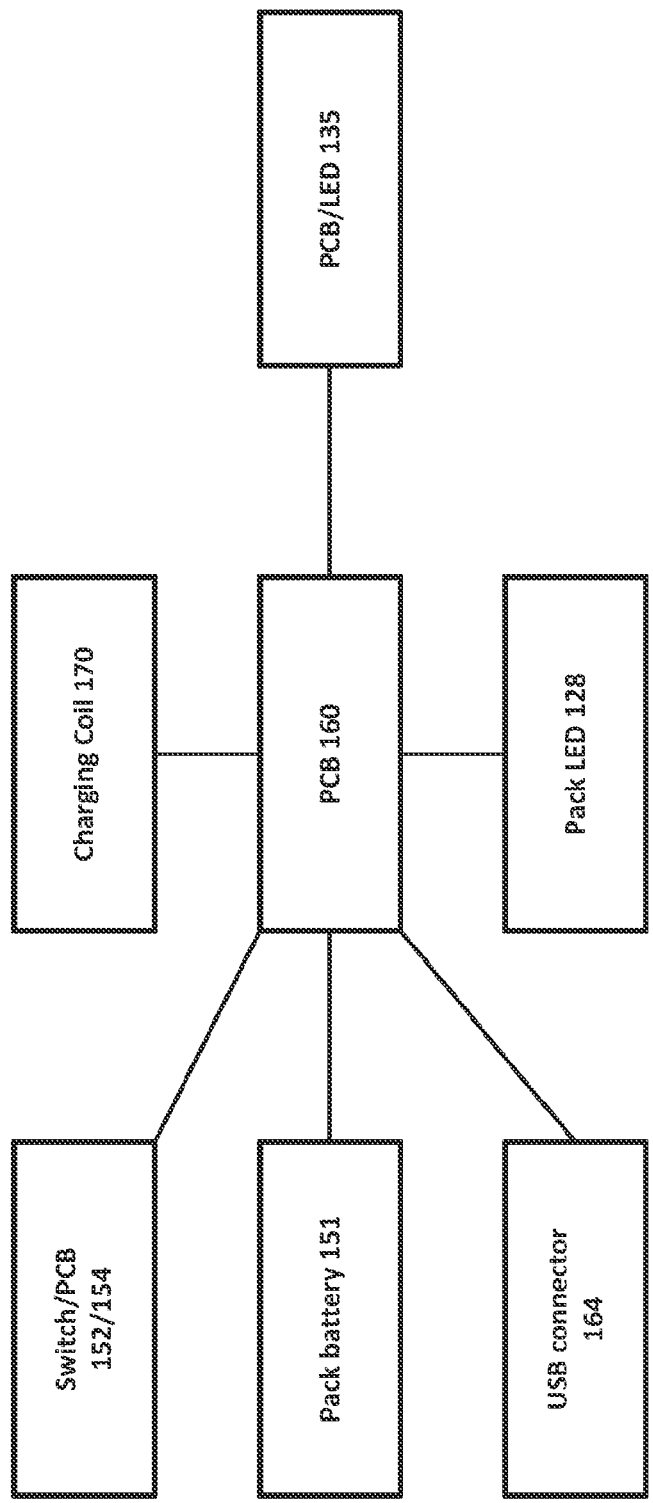
FIG. 8 is a schematic diagram of the electrical/electronic configuration of the pack of FIG. 2 in accordance with some embodiments of the disclosure.

FIG. 8 is a schematic diagram of the electrical/electronic configuration of the pack 100. Note that this diagram is primarily concerned with control operation rather than power supply (so, for example, a direct power supply linkage from pack battery 151 to switch/PCB is omitted). FIG. 8 also assumes that the control functionality for the pack resides on the main PCB 160, although some elements of this control functionality may be distributed or off-loaded as appropriate to PCB 154 or PCB 135.

The primary control inputs to the PCB 160, in accordance with some embodiments of the disclosure, are as follows:
  a) external power supply available through USB connector 164 (yes/no).
    (There may also be additional control information provided by the USB connector, for example, to reset any usage data maintained within PCB 160, but these are not relevant for present purposes.)
  b) level of charge in pack battery 151. The PCB then uses the LED lights 128 of the pack to provide the user with an indication of this charge level.
  c) pack lid 140 open or shut according to switch 152.
  d) presence of an e-cigarette in tube 132A (yes/no).
(It will be appreciated that this set of control inputs is provided by way of example only, and other embodiments may not have all the above control inputs and/or may have additional control inputs.)

With regard to (d), the presence or absence of an e-cigarette can only change when the lid is open, as detected by switch 152 (otherwise an e-cigarette cannot be inserted into or removed from the tube 132A). There are various ways in which such a change can be determined. For example, inserting an e-cigarette will change the effective inductance of the charging coil 170, by virtue of the mutual inductance arising from the corresponding induction charging coil in the e-cigarette, and this change in effective inductance can be detected by the PCB 160 or other sensor. Alternatively, if the pack uses a wired connection for re-charging, then the resistance across and/or current through the wired connection will change upon contact with an e-cigarette. A further possibility is to use some other sensing or communication mechanism, e.g. mechanical, electrical, or optical, to determine the presence or absence of an e-cigarette in tube 132A. For example, the PCB 135 may capture light from LED 135 which is reflected back towards PCB 135, and the amount of such reflected light will vary according to whether or not an e-cigarette is present in tube 135. As another example, the bottom of tube 132A may include a mechanical switch, which is activated when an e-cigarette sits in the tube. The skilled person will be aware of further possible mechanisms for detecting the presence of an e-cigarette in the tube 132A.

The PCB 160 may also be provided with information concerning the level of charge of the battery within the e-cigarette. This information may just be a piece of binary information, namely whether or not the battery is fully charged. Alternatively, the PCB 160 may receive more granular information concerning the level of charge of the battery within the e-cigarette, such as an approximate percentage of the current charge level. As before, there are various ways in which the PCB 160 may be provided with this information (which may potentially different from how the PCB determines the presence (or absence) of an e-cigarette in tube 132A). For example, as the e-cigarette battery becomes more charged, this may increase the effective loading on the charging circuit (wired or wireless), in that the charging has to overcome the opposing voltage of the battery which is being charged (which generally rises with an increasing level of charge). This increase in the effective loading on the charging circuit may be monitored to provide an indication of the charge level of the battery within the e-cigarette. Alternatively, for a wired connection between the pack and the e-cigarette, the voltage level of the battery within the e-cigarette may be applied to a particular contact, and hence is available for direct measurement by the pack. Another possible approach is for the e-cigarette itself to monitor the voltage (and hence charge) level of its battery and then to communicate this information to the re-charging pack—for example, over some data or control line for a wired connection, or over some wireless communication link (e.g. Bluetooth) for wireless (such as induction) charging.

As mentioned above, the annular light element 133 is used to provide an indication to the user of the charging state of an e-cigarette inserted into the tube 132A. The charging state may indicate one or more of the following:
  a) whether or not the pack is currently charging the e-cigarette battery (through coil 170 in the embodiment of FIG. 3);
  b) whether or not the e-cigarette battery is fully charged;
  c) some indication of the level of charge of the e-cigarette (intermediate between empty and full);
  d) an error state or cut-off, e.g. because of an excess temperature has been detected in the pack or the e-cigarette.
(It will be appreciated that this set of indications is provided by way of example only, and other embodiments may not provide all the above indications and/or may provide additional indications.)

Regarding (d), the pack and/or the e-cigarette may be provided with one or more suitable temperature sensors to make such a detection of over-heating, and such sensor(s) may supply a further control input to the PCB 160 to flag that the pack or e-cigarette is above a threshold temperature. The skilled person will be aware of various other error states that may arise (and be indicated to a user), for example, the detection of excess charging voltage or current, or a failure to determine whether or not an e-cigarette is present in tube 132A, etc.

In accordance with some embodiments of the disclosure, the PCB 160 controls the PCB 135 and its associated light diode according to the charging conditions specified in Table 1 below. In particular, the CPU 160 detects transitions between the various states, based on the control inputs mentioned above, in order to detect the current state, and then sets the light operation as appropriate for (i.e. corresponding to) the current state.

TABLE 1

State of light signal according to charging state

| State | Light operation |
|---|---|
| No e-cigarette in pack | Off |
| Connected to external power supply (via USB 164)-e-cigarette charging | Pulsed (flashing) |
| Connected to external power supply (via USB 164)-e-cigarette fully charged | On |
| Not connected to external power supply-open lid-e-cigarette charging | Pulsed for 10 seconds-then fades out |
| Not connected to external power supply-open lid-e-cigarette fully charged | On for 10 seconds-then fades out |
| Not connected to external power supply-lid closed | Any existing lighting is faded out |

(Note that Table 1 only relates to functional states of the pack and e-cigarette—it does not include error states such as over-current; these can be indicated or flagged by similar modes of flashing lights, lights on and off, etc., as for the functional states.)

The annular lighting element 133 (in combination with the PCB and LED 135) provides the user with an indication of the charging state of an e-cigarette in tube 132A. If no e-cigarette is present in tube 132A, the light (as provided by the PCB/LED 135 and annular lighting element) is off. However, if an e-cigarette is present, and the pack is connected to an external power supply, such as via USB connector 164, then the light has one of two states: (i) flashing or pulsing (intermittently on), to indicate that the battery in the e-cigarette is being charged; and (ii) continuously on to indicate that the battery in the e-cigarette is fully charged.

If an e-cigarette is present, but the pack is not connected to an external power supply, then the behavior is modified in view of the limited power available within the pack battery 151. If the lid is open, then the light is again flashed or pulsed to indicate that the battery in the e-cigarette is partly charged, or is permanently on to indicate that the battery in the e-cigarette is fully charged. However, this illumination of the light (either intermittent or continuous) is only for a first predetermined time period, say 10 seconds, after which the light fades out. This period is long enough to provide a clear indication of the charging status to the user, but no long enough to drain significant power from the pack battery 151. If the lid is closed while the light is illuminated (again either intermittently or continuously), then the light fades out over a predetermined time period, for example, 2 seconds. For example, if the pack is connected to the mains supply (with the lid already closed), the light is illuminated to indicate the charge state of the e-cigarette in tube 132A. If the pack is now disconnected from the mains supply, this light signal is faded out.

Although not explicitly indicated in Table 1, if the pack is not connected to an external power supply, the battery 151 of the pack 100 may be too depleted to re-charge a partly depleted e-cigarette battery. In this case, the light may still be illuminated intermittently to indicate the partly charged status of the e-cigarette (even though there is no active re-charging in progress). However, if the e-cigarette is fully charged, this can be indicated by having the light continuously on, subject to the fading specified in Table 1 according to whether the lid is open or shut—in essence, if the lid is shut, then the fading begins immediately, whereas if the lid is open, the fading is delayed until after expiry of the first predetermined time period. Of course, if the battery 151 of the pack becomes fully deleted and there is no connection to an external power supply, then the light provided by PCB 135 will necessarily be off (because there is nothing to power it). Such a situation, namely the depletion of the pack battery, will be apparent to a user because the pack LEDs 128 will likewise be out (off) as well.

The above scheme of indications allows a user to rapidly determine the current charging state—especially whether the e-cigarette is currently being charged or is now fully charged. For example, if the pack is disconnected from the mains and the lid is closed, the lighting element 133 will be off. When a user opens the pack to access an e-cigarette, the lighting element 133 will be illuminated for the predetermined period of time to allow a user to discern the current charge state of an e-cigarette in tube 132A.

Although it is relatively common for re-chargeable electronic devices, such a mobile (cell) phones, to provide some indication of charging state, the context of e-cigarettes is challenging having regard (inter alia) to the following factors:
- e-cigarettes are relatively compact devices (compared say with smartphones), hence their battery capacity is more restricted by the limited physical space available, and they may therefore require more frequent re-charging.
- e-cigarettes are relatively low-level devices (again compared say with smartphones). The smaller size and relatively low-level nature of the e-cigarette makes it more difficult for an e-cigarette itself to provide an indication of charging state.
- the packs used for re-charging an e-cigarette themselves are portable electronic devices, and hence need re-charging themselves. The user therefore has to be able to distinguish between (i) the re-charging state of the e-cigarette, and (ii) the re-charging state of the pack.
- the packs may accommodate multiple articles, such as an e-cigarette 10 which is to be charged, and a cartomizer cartomizer 30, which is not to be charged, where such articles may appear visually quite similar when located in the pack (for example in openings 132 and 131 respectively).

These factors are addressed as described herein by careful consideration of the relative geometry of the pack and the e-cigarette being re-charged. In particular, the annular light element is intimately associated with the e-cigarette in positional terms to provide a clear visual indication of the charging state of the e-cigarette. Accordingly, the user can readily understand that the LEDs 128 indicate the charging state of the pack 100, not of the e-cigarette.

Furthermore, the annular light element can help a user to distinguish between items located in different openings in a pack. For example, if opening 132 is used to accommodate an e-cigarette 10 and opening 131 is used to accommodate a cartomizer 30 (which can be somewhat similar to an e-cigarette when seen from the end), the illuminated annular light element 133 helps a user to identify the e-cigarette as the device to use.

In addition, some embodiments of the pack may provide two or more openings for receiving an e-cigarette, where each opening supports electrical recharging of an e-cigarette accommodated therein. In such an implementation, each opening may be provided with an annular light element to clearly indicate the charging status of an e-cigarette which is located in that particular opening. This may then help a user to distinguish, for example, between an e-cigarette in one opening that is fully charged and an e-cigarette in another opening which is only partly charged (or not charged at all).

Some embodiments of the disclosure provide a pack for holding and re-charging an e-cigarette, such as pack 100 as depicted in FIG. 2. The pack comprises a first tube, such as tube 132A, having a substantially cylindrical shape. The first tube has a hole, such as hole 132, defined by an open end of the first tube for receiving an e-cigarette into the first tube to be held therein. The pack further comprises a re-charging mechanism, such as coil 170, for re-charging the e-cigarette held within the first tube. The pack further comprises a light for indicating a charging state of the e-cigarette held within the first tube. The light is located at the open end of said first tube adjacent the hole for receiving the e-cigarette into the first tube.

The pack itself may include a re-chargeable battery, such as battery 151, plus associated lighting, such as LEDs 128, to indicate a charging state for the pack battery. In such a situation it is helpful for the user to be able to readily ascertain the separate charge levels of both the pack and also an e-cigarette included in the pack. Locating the light to indicate the charge state of the e-cigarette at the open end of the first tube helps to clarify for a user that this light does indeed indicate a charge state of the e-cigarette.

The pack may use any appropriate mechanism to re-charge the e-cigarette, such as wireless induction charging, or providing a wired connection between the pack and the e-cigarette held within said first tube. One advantage of wireless charging is that the e-cigarette may be easily placed within the first tube without any further action. Accordingly, the first tube can be readily used not only for re-charging the e-cigarette, but also for holding the e-cigarette within the pack (even when fully charged) as the pack is carried around, etc.

If a wired connection is provided between the pack and the e-cigarette, then some portion of the e-cigarette may be removed (separated) to expose a connector, prior to insertion of the e-cigarette into the first tube. In this case, only a portion of the e-cigarette (including the connector and battery to be re-charged) may be received into the first tube, which will generally be somewhat shorter than the complete e-cigarette. Nevertheless, it is desirable for the inserted portion to protrude slightly out of the first tube for ease of removal, but also to be able to accommodate a full length e-cigarette within the tube (for carrying, etc). There are various ways that this can be achieved, such as by removing only a small portion of the e-cigarette to expose the connector; providing additional lid space to accommodate the difference in length between the e-cigarette with or without the connector exposed; and transferring the portion of the e-cigarette which is removed to expose the connector to the other end of the e-cigarette (analogous to a cap for some ball-point pens), thereby substantially maintaining the overall length of the e-cigarette. Alternatively, the pack may be provided with a separate facility to hold the portion of the e-cigarette which is removed to expose the connector, thereby allowing the e-cigarette to be carried around in (partly) disassembled form.

The close proximity between the light and the opening of the first tube provides the user with an immediate visual connection between the two, and hence a ready appreciation that the charging status indicated by the light applies to the e-cigarette located in the first tube. Note that a pack may have two or more tubes for re-charging e-cigarettes, and each such tube may be provided with a positionally associated light to indicate the respective charging status for an e-cigarette in that tube.

In some implementations, the open end of the first tube defines a circumference of the hole, and the light extends at least part-way around the circumference of the hole; in the implementation shown in FIG. 2, the light extends all around the circumference of the hole. This ensures that the light is visible to the user at any angle of viewing for the pack, and also emphasizes the close association between the light indicator and the tube containing the e-cigarette.

The light can be provided by any suitable implementation—for example, the light may be provided by one or more light emitting diodes (LEDs), which may be located at the open end of said first tube. An alternative arrangement, such as illustrated in FIG. 2, is to form the light from two components, namely a light producing component (such as one or more LEDs), and a light transmitting component, such as the annular light element 133. The light transmitting component is transparent or translucent, and acts as a form of light guide to transmit light from the light producing component to the open end of the first tube to be seen by a user. In some implementations, the light transmitting component is translucent to create a more diffuse and consistent illumination (such that a user may not be aware that the light transmitting component is not itself producing the light).

This latter arrangements offers flexibility in terms of the layout of the components within the pack, and also in terms of the distribution of visible light to the user. For example, in the pack of FIG. 2, the LED can be located directly on the PCB 135, while the annular light element 133 can be shaped to surround the opening 132. In contrast, having the hole 132 directly surrounded by a set of LEDs would generally be more complex in terms of wiring and overall design.

Although the light transmitting component in FIG. 2 comprises a single tube, the skilled person will be aware of many other possible implementations. For example, the light transmitting component may comprises one or more optical fibers which can be utilized to output light from the light producing component in the desired location(s) adjacent the open end of the first tube.

In the implementation described above, the light has two main settings (other than off) for indicating the charging state of the e-cigarette to a user, namely continuously on and intermittently on—i.e. pulsed or flashed at a frequency that is readily discernible to a user, e.g. 2 Hz. However, there are many other ways in which the light can provide information to a user. For example, the pulse frequency and/or duty cycle of the pulse may be modified according to the charging state; the color of the light may be modified according to the charging state; the brightness of the light may be modified according to the charging state; the extent of illumination may be modified according to the charging state. It will be appreciated that two or more of these signaling techniques may be utilized as appropriate to indicate a wide range of states.

As examples of the above, the light may be controlled to provide green illumination for an e-cigarette which is fully charged, amber illumination for an e-cigarette which is partly charged, and red illumination for an e-cigarette which has little or no charge. This change in color may be achieved by having 3 different LEDs of different color, and illuminating the appropriate LED according to the desired color, or else a single LED of variable color, which can then be controlled accordingly. Another example is that the duty cycle of the pulsing (i.e. the portion of the pulse cycle for which the light is illuminated) may be increased in proportion to the relative charging level of the e-cigarette battery—hence the light remains fully on (a pulse cycle of unity) when the battery is fully charged. A further example is where the light comprises multiple segments, and the number of segments illuminated is increased in proportion to the relative charging level of the e-cigarette battery. This may be implemented, for example, by having multiple LEDs (say four), one of which is illuminated for a charging level above 25%, two of which are illuminated for a charging level above 50%, and so on. Each LED may be directly visible to a user, or may be linked to a respective light transmitting component, such as a light guide. For example, each of the four light guides may be formed into a quadrant around the open end of the first tube, so that the relative charging level of the e-cigarette battery is then reflected in the proportion of the circumference of the open end of the first tube which is illuminated.

The operation of the light to provide the indication of charging status of the e-cigarette battery must also have regard to the limited power available from the pack battery. Thus while the light can provide an ongoing indication of charging status while the pack is connected to receive external power, such as through USB link 164, the operation of the light is curtailed when no such power supply is currently connected so as to conserve power in the pack battery 151. For example, if the pack becomes disconnected from such external power supply, and the lid is closed, then the illumination (continuous or intermittent) of the light is terminated—for example, the light may be faded out over a short time interval, such as approximately 2 seconds.

In addition, if the lid is opened while the power is disconnected (or alternatively, if the external power is disconnected with the lid open), then the illumination (continuous or intermittent) of the light may be commenced (or maintained) for a predetermined period of time before again being terminated, such as by-fade out over a relatively short time interval (e.g. approximately 2 seconds). The predetermined period of time may be selected to allow the user a reasonable time to see the light and ascertain the charging status of the e-cigarette, while also helping to limit the amount of power taken from the pack battery. The predetermined period is generally longer than the short time period used to fade out the lights when the lid is closed, and may, for example, lie in the range 5 to 25 seconds, or 5 to 15 seconds, or 8 to 12 seconds. In the particular example given in Table 1 above, this predetermined period is 10 seconds.

In conclusion, this disclosure shows by way of illustration various embodiments in which that which is claimed may be practiced. The advantages and features of the disclosure are of a representative sample of embodiments only, and are not exhaustive and/or exclusive. They are presented only to assist in understanding and to teach that which is claimed. It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc., other than those specifically described herein. The disclosure may include other inventions not presently claimed, but which may be claimed in future.

The invention claimed is:

1. A pack for holding and re-charging an e-cigarette, the pack comprising:
    a first tube having a substantially cylindrical shape, the first tube having a hole defined by an open end of the first tube for receiving an e-cigarette into the first tube to be held therein;
    a re-charging mechanism for re-charging the e-cigarette held within the first tube; and wherein there is an electrical contact within the first tube, the electrical contact provided at a base of the first tube for contacting a base of the e-cigarette.

2. The pack of claim 1, further comprising a rechargeable battery and an associated set of lights, wherein the set of lights further indicates whether or not the rechargeable battery of the pack is currently charging.

3. The pack of claim 2, wherein the rechargeable battery is charged via a USB link using a USB connector located on an underside of the pack.

4. The pack of claim 2, wherein the set of lights comprises:
    a light producing component; and
    a light transmitting component.

5. The pack of claim 4, wherein the light producing component comprises at least one light emitting diode (LED).

6. The pack of claim 4, wherein the light transmitting component is transparent or translucent and transmits light from the light producing component, which is located within the pack, to the open end of the first tube to be seen by a user.

7. The pack of claim 1, further comprising a hinged lid which can open or close.

8. The pack of claim 7, wherein the pack is configured to detect whether or not:
    the pack is connected to an external power supply; and the lid is open.

9. The pack of claim 1, wherein the recharging mechanism comprises a wired connection between the pack and the e-cigarette held within the first tube.

10. The pack of claim 1, wherein the first tube receives at least a portion of the e-cigarette which contains a battery or a cell to be recharged.

\* \* \* \* \*